(12) United States Patent
Malik

(10) Patent No.: US 8,913,290 B2
(45) Date of Patent: Dec. 16, 2014

(54) SYSTEM AND METHODS FOR DETERMINING COLOR CHARACTERISTICS OF AN IMAGE

(71) Applicant: Xerox Corporation, Norwalk, CT (US)

(72) Inventor: Amal Z Malik, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 132 days.

(21) Appl. No.: 13/741,406

(22) Filed: Jan. 15, 2013

(65) Prior Publication Data

US 2014/0198325 A1    Jul. 17, 2014

(51) Int. Cl.
*G06F 15/00*    (2006.01)
*G07F 19/00*    (2006.01)
*H04N 1/46*    (2006.01)

(52) U.S. Cl.
CPC ....................................... *H04N 1/46* (2013.01)
USPC ................ 358/1.9; 358/2.1; 358/518; 705/34

(58) Field of Classification Search
USPC .......................................... 358/1.9, 2.1, 518
See application file for complete search history.

(56) References Cited

U.S. PATENT DOCUMENTS

| 8,493,514 | B2* | 7/2013 | Choi et al. | 348/655 |
| 2009/0265286 | A1* | 10/2009 | Nagarajan | 705/400 |
| 2012/0143736 | A1* | 6/2012 | Li | 705/34 |
| 2013/0066756 | A1* | 3/2013 | Malik et al. | 705/34 |
| 2013/0166477 | A1* | 6/2013 | Malik et al. | 705/400 |
| 2013/0243321 | A1* | 9/2013 | Shimazaki | 382/170 |

OTHER PUBLICATIONS

U.S. Appl. No. 13/275,934, filed Oct. 18, 2011; Method and System for Billing Based on Color Component Histograms; Clark et al.

\* cited by examiner

*Primary Examiner* — Barbara Reiner

(57) ABSTRACT

Disclosed embodiments relate to a method implementable on a computing device for determining color characteristics of an image. The method includes identifying one or more regions in the image based on a luminance value associated with pixels in the image. Each region comprises a set of pixels having a predefined range of luminance values. The set of pixels associated with the one or more regions are categorized into one or more predefined color categories corresponding to each of the one or more regions, based on a chroma value associated with each pixel in the set of pixels. The color characteristics of the image are determined based on a count of the categorized pixels in each of the one or more predefined color categories.

20 Claims, 4 Drawing Sheets

SYSTEM AND METHODS FOR DETERMINING COLOR CHARACTERISTICS OF AN IMAGE

TECHNICAL FIELD

The presently disclosed embodiments are related, in general, to image processing. More particularly, the presently disclosed embodiments are related to systems and methods for determining color characteristics of an image.

BACKGROUND

An image corresponds to a pictorial representation of an object or a document. The image may be captured by utilizing one or more image capturing devices, such as a camera and a scanner. A typical image may include one or more pixels with high color content and one or more pixels with less or no color content. Such pixels in the image are arranged in a predetermined manner to display the content of the image. Printing such images involves printing the pixels ranging from high color content to less or no color content. The number of pixels with color content contained in the image determines the amount of color ink to be used during the printing operation. A client may be billed for the printed image according to the amount of the color ink used.

In certain scenarios, determining the count of the pixels having different levels of color content may be difficult. Incorrect determination of such a count of pixels may lead to incorrect determination of image as neutral or color. This may lead to image quality defects in the output of scans and copies. Further, incorrect determination of the image as neutral or color may lead to complaints from the customer regarding billing. For example, a dark neutral image may be incorrectly marked as a color image; hence, the customer may be billed accordingly.

SUMMARY

According to embodiments illustrated herein, a method implementable on a computing device for determining color characteristics of an image is disclosed. The method includes identifying one or more regions in the image based on a luminance value associated with pixels in the image. Each region comprises a set of pixels having a predefined range of luminance values. Thereafter, the set of pixels associated with the one or more regions are categorized in one or more predefined color categories corresponding to the each of the one or more regions based, at least in part, on a chroma value associated with each pixel in the set of pixels. Finally, the method includes determining the color characteristics of the image based on a count of the categorized pixels in each of the one or more predefined color categories.

According to embodiments illustrated herein, a method implementable on a Multi-Function Device (MFD) is disclosed. The method includes scanning a document to obtain an image. One or more regions in the image are identified based on a luminance value associated with one or more pixels in the image. Each region comprises a set of pixels having a predefined range of luminance values. The set of pixels associated with each of the one or more regions are categorized in one or more predefined color categories corresponding to the each of the one or more regions based on a chroma value associated with the each pixel. Further, the method includes determining color characteristics of the image based on at least one of a count of the categorized pixels in each of the one or more predefined color categories, weights assigned to each of the one or more predefined color categories, a white-point offset of the MFD, or a noise value associated with the MFD. Finally, the method includes classifying the image at least as a color image or a neutral image based on the color characteristics.

According to embodiments illustrated herein, a system for determining color characteristics of an image is disclosed. The system includes an analysis module configured to identify one or more regions in the image based on a luminance value associated with one or more pixels in the image. Further, the analysis module is configured to determine a chroma value associated with each pixel in each of the one or more regions. Additionally, the analysis module is configured to categorize the each pixel in one or more predefined color categories corresponding to each of the one or more regions based on the chroma value. The system further includes a characterization module configured to determine the color characteristics of the image based on a count of the categorized pixels in each of the one or more predefined color categories.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

Figure 1:
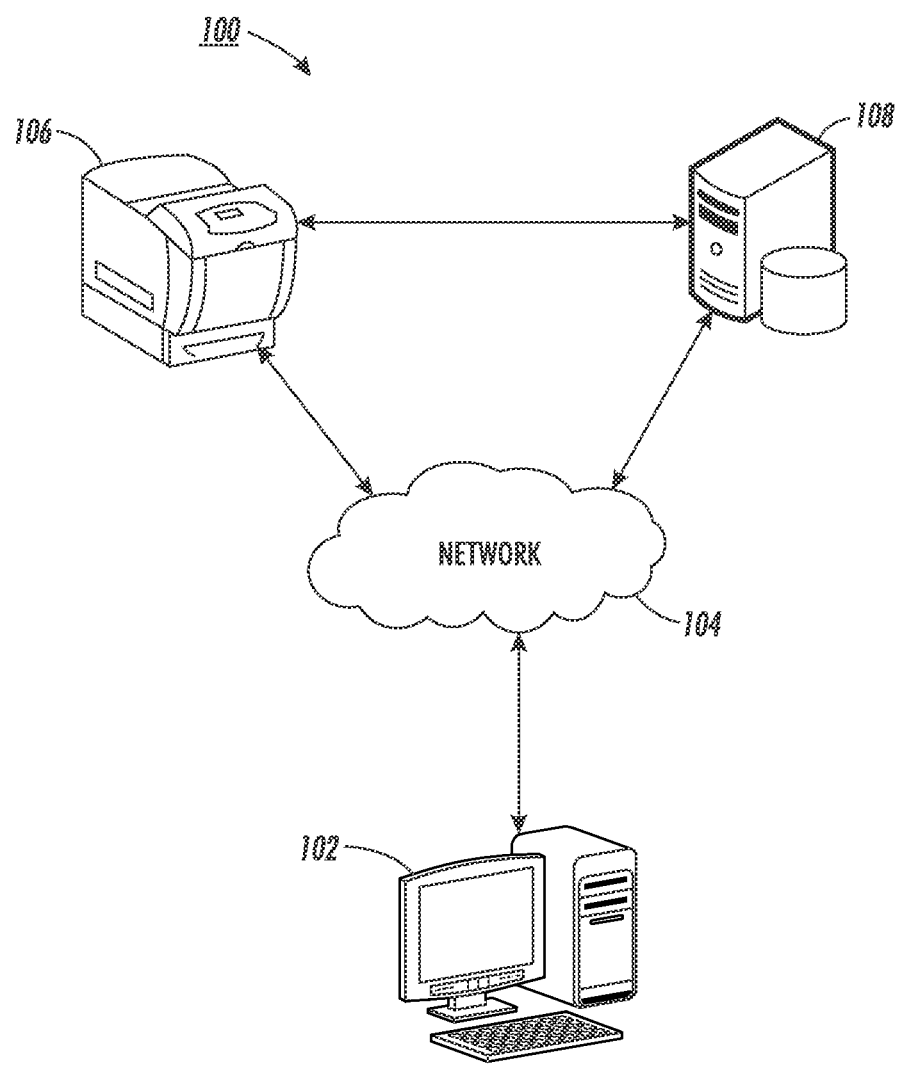
FIG. 1 is a block diagram illustrating a system environment, in which various embodiments can be implemented.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

DEFINITIONS

The following terms shall have, for the purposes of this application, the respective meanings set forth below.

An "image" refers to a collection of data, including image data in any format, retained in an electronic form. In an embodiment, the image may correspond to a pictorial representation of an object or a document.

A "printer" refers to any apparatus, such as a digital copier, bookmaking machine, facsimile machine, multi-function machine (performs scanning, emailing), and the like, which performs a print (original and/or duplicate) outputting function for any purpose in response to digital data sent thereto.

A "print" refers to an image on a medium (such as paper), that is capable of being read directly through human eyes, perhaps with magnification. According to this disclosure, handwritten or partially handwritten image on a medium is considered as an original print. In an embodiment, a duplicate print corresponds to an exact replica of the original print derived by scanning, printing, or both.

A "Multi Function Device" (MFD) refers to a device that can perform multiple functions. Examples of the functions may include, but are not limited to, printing, scanning, copying, faxing, emailing, and the like. In an embodiment, the MFD includes a scanner and a printer for scanning and printing one or more documents, respectively. In an embodiment, the MFD has communication capabilities that enable the MFD to send/receive data and messages in accordance with one or more communication protocols such as, but not limited to, FTP, WebDAV, E-Mail, SMB, NFS, and TWAIN.

"Color characteristics of an image" refer to a measure of color in an image. In an embodiment, the color characteristics include one or more of color, and hue.

A "pixel" refers to an element of data that may be provided in any format, color space, or compression state that is associated with or readily convertible into data that can be associated with a small area or spot in an image that is printed or displayed. In an embodiment, a pixel is represented by bits where the number of bits in a pixel is indicative of the information associated with the pixel. In an embodiment, the information may correspond to, but not limited to, mono color information, gray color information or any other color information. For example, in monotone images, a pixel is represented by one bit and hence the pixel can have only two possible values i.e. white and black. Similarly, in grayscale images, a pixel is represented by eight bits and hence the pixel may have 256 shades of gray without any color information. In a color image, a pixel is typically represented by 24 bits. In an embodiment, in RGB color space, each of the 24 bits associated with the pixel are deterministic of both luminance value and the chrominance value associated with the pixel. In an embodiment, in CIELab, YCbCr, and YUV color spaces, 8 bits out of 24 bits are used to represent the luminance value while rest of 16 bits are used to convey chrominance information. In an embodiment, in CMYK color space, each of the 24 bits is used to convey the chrominance information. In another embodiment, 32 bits are used to convey the chrominance and luminance intensity values.

A "luminance value" refers to a measure of brightness of a pixel in an image.

A "chroma channel" corresponds to channels in a color space that carries color information. For example, in YUV color space, 'U' and 'V' channels are the chroma channels and 'Y' channel is the luminance channel. Similarly, in YCbCr color space, 'Cb' and 'Cr' are the chroma channels.

A "chroma value" refers to a measure of color content associated with a pixel in an image. In an embodiment, the chroma value associated with a pixel is deterministic of the color characteristics of the pixel. In some embodiments, chroma value of a pixel is measured in reference to an offset value. In an embodiment, the offset value is deterministic of a neutral color value in a color space. For example, 128 represents the neutral color value for chrominance channels in color spaces such as, but are not limited to, CIELab, YUV, and YCbCr. Further, a pixel with a chroma value greater than or equal to 148 or less than or equal to 108 (e.g., 128±20) in at least one of the chroma channels is a color pixel. In another example, a pixel with chroma value of 128±3 in both the chroma channels is a neutral pixel. It would be apparent to a person having ordinary skill in the art that ranges for the color pixels and the neutral pixels have been mentioned for illustrative purposes. In an embodiment, the ranges for the color pixels and the neutral pixels can vary based on the color spaces and application. In an embodiment, the chroma value is determined based on a combination of the 2 chrominance channels in a color space. Examples of the combination of the 2 chrominance channels include, but not limited to, a and b channels in CIELab color space, Cb and Cr channels in YCbCr color space, or U and V channels in YUV color space.

A "fuzzy color pixel" refers to a pixel having a chroma value closer to chroma value of a neutral pixel than that of a color pixel. In an embodiment, it may be difficult to determine whether the fuzzy color pixel is to be tagged as a color pixel or a neutral pixel. In an embodiment, the chroma value of a fuzzy color pixel for at least one of the chroma channels lies between 109-118 or 138-147, when the other chroma channel is not in a range for the color pixel (i.e., chroma value greater than or equal to 148, or less than or equal to 108). In another embodiment, fuzzy color pixel may be determined based on the combination of values of both the chroma channels.

A "fuzzy neutral pixel" refers to a pixel having a chroma value that is not deterministic of whether the pixel is to be tagged as a color pixel or a neutral pixel. In an embodiment, the chroma value of a fuzzy neutral pixel for at least one of the chroma channels lies between 124-119 or 132-137, when the chroma value of the other chroma channel is not in the color pixel range. In another embodiment, fuzzy neutral pixel may be determined based on the combination of values of both the chroma channels.

FIG. 1 is a block diagram illustrating a system environment 100, in which various embodiments can be implemented. The system environment 100 includes a computing device 102, a network 104, an MFD 106, and a database server 108.

The computing device 102 communicates one or more images with the MFD 106 and the database server 108. In an embodiment, the computing device 102 generates one or more queries to extract the one or more images from the database server 108. In an embodiment, the computing device 102 automatically generates the one or more queries to extract the one or more images. In an alternate embodiment, a user of the computing device 102 inputs the one or more queries. In an embodiment, the computing device 102 instructs the MFD 106 to scan an image. The computing device 102 may receive the scanned image from the MFD 106. Further, the computing device 102 may instruct the MFD 106 to print the scanned image. In an embodiment, the computing device 102 instructs the MFD 106 to copy images. In an embodiment, the computing device 102 determines the color characteristics of the one or more images. Some of the examples of the computing device 102 include a personal computer, a laptop, a PDA, a mobile device, a tablet, or any device that has the capability to receive and process images. In one embodiment, images are documents.

The network 104 corresponds to a medium through which content and messages flow between various devices of the system environment 100 (e.g. the computing device 102, the MFD 106, and the database server 108). Examples of the network 104 may include, but are not limited to, a Wireless Fidelity (WiFi) network, a Wireless Area Network (WAN), a Local Area Network (LAN) or a Metropolitan Area Network (MAN). Various devices in the system environment 100 can connect to the network 104 in accordance with the various wired and wireless communication protocols such as Transmission Control Protocol and Internet Protocol (TCP/IP), User Datagram Protocol (UDP), and 2G, 3G, or 4G communication protocols.

In an embodiment, the MFD 106 scans, copies and prints one or more images based on the instructions received from the computing device 102. In an embodiment, the MFD 106 transmits the scanned image to the computing device 102. In another embodiment, the MFD 106 stores the scanned image in the database server 108. In an embodiment, the MFD 106 stores the scanned image in a local memory of the MFD 106. In an embodiment, the MFD 106 sends the scanned image to the computing device 102. In an alternate embodiment, the MFD 106 prints the scanned image to produce copies. In an embodiment, the MFD 106 determines the color characteristics of the scanned image.

The database server 108 stores one or more images received from the computing device 102 and the MFD 106. In an embodiment, the database server 108 may receive a query from the computing device 102 and/or the MFD 106 to extract the one or more images. The database server 108 may be realized through various technologies, such as, but not limited to, Microsoft® SQL server, Oracle, and My SQL. In an embodiment, the computing device 102 may connect to the database server 108 using one or more protocols such as, but not limited to, ODBC protocol and JDBC protocol.

A person having ordinary skill would understand that the scope of the disclosure should not be limited to the system environment 100 that includes a standalone database server 108. In an embodiment, the database server 108 can be implemented on at least one of the computing device 102 or the MFD 106.

Figure 2:
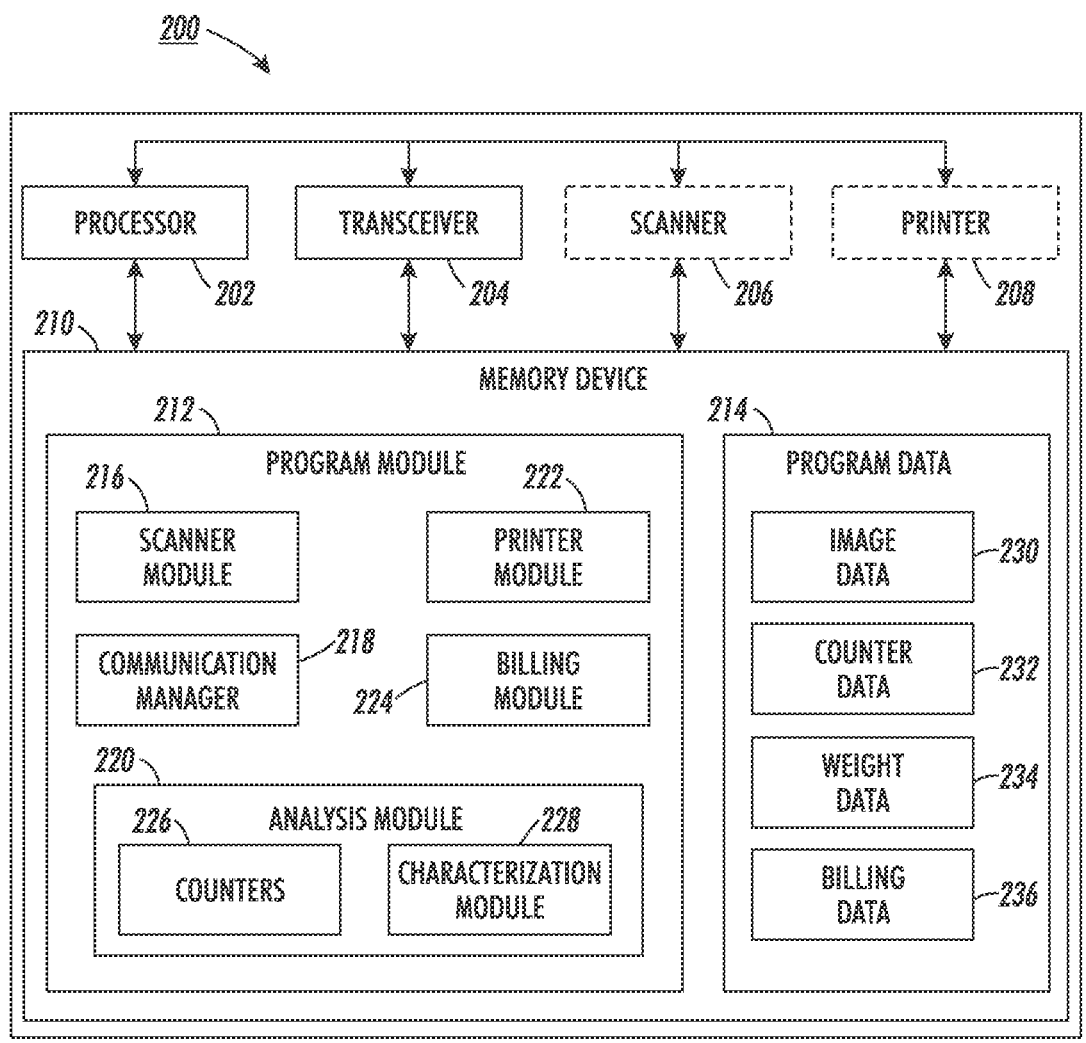
FIG. 2 is a block diagram of a system for determining the color characteristics of an image in accordance with at least one embodiment.

FIG. 2 is a block diagram of a system 200 for determining the color characteristics of an image in accordance with at least one embodiment. The system 200 is described in conjunction with FIG. 1.

The system 200 includes a processor 202, a transceiver 204, and a memory device 210. In an embodiment, the system 200 may correspond to the computing device 102 (Refer to FIG. 1) and/or the MFD 106. In a scenario where the system 200 corresponds to the MFD 106, the system 200 would further include a scanner 206 and a printer 208. For the purpose of ongoing description, the system 200 has been considered the MFD 106. However, the scope of the disclosed embodiment should not be limited to the system 200 as being the MFD 106. The system 200 can also be realized as the computing device 102.

The processor 202 is coupled to the transceiver 204 and the memory device 210. The processor 202 executes a set of instructions stored in the memory device 210. The processor 202 can be realized through a number of processor technologies known in the art. Examples of the processor 202 may include, but are not limited to, X86 processor, RISC processor, ASIC processor, CISC processor, or any other processor.

The transceiver 204 transmits and receives messages and data to/from the various components of the system environment 100 (e.g. the computing device 102 and the database server 108). Examples of the transceiver 204 may include, but are not limited to, an antenna, an Ethernet port, a USB port or any other port that can be configured to receive and transmit data from external sources. The transceiver 204 transmits and receives data/messages in accordance with the various communication protocols, such as, Transmission Control Protocol and Internet Protocol (TCP/IP), User Datagram Protocol (UDP), and 2G, 3G, or 4G communication protocols.

In an embodiment, the scanner 206 is an optical device that scans a document to obtain an image of the document. In an embodiment, the scanner 206 may utilize various image capturing techniques such as, but not limited to, a charge-coupled device (CCD) and a Contact Image Sensor (CIS), to scan the document. In an embodiment, the scanner 206 implements a linear scanning technique. In another embodiment, the scanner 206 implements a two-dimensional scanning technique.

In an embodiment, the printer 208 prints the images scanned by the scanner 206. In another embodiment, the printer 208 prints the images received from the database server 108. In an embodiment, the printer 208 may utilize one or more printing technologies, such as, but not limited to, laser printing, thermal printing, dot matrix printing, and inkjet printing.

The memory device 210 stores a set of instructions and data. In an embodiment, data may correspond, but not limited, to counters, scanned images and temporary images that are generated in between processing of the scanned image. Some of the commonly known memory device implementations include, but not limited to, a random access memory (RAM), read only memory (ROM), hard disk drive (HDD), and secure digital (SD) card. Further, the memory device 210 includes a program module 212 and a program data 214. The program module 212 includes a set of instructions that is executable by the processor 202 to perform specific actions on the system 200. The program module 212 further includes a scanner module 216, a communication manager 218, an analysis module 220, a billing module 224, and a printer module 222. The analysis module 220 further includes counters 226, and a characterization module 228. It is apparent to a person having ordinary skill in the art that the set of instructions stored in the memory device 210 enables the hardware of the system 200 to perform the predetermined operation.

The program data 214 includes an image data 230, a counter data 232, a weight data 234, and a billing data 236.

The scanner module 216 facilitates the scanner 206 to scan one or more documents to generate images of the one or more documents. The scanner module 216 includes a driver module that enables the scanner 206 to scan the one or more documents. Further, the scanner module 216 stores the originally scanned images as the image data 230.

In an embodiment, the communication manager 218 transmits a query to the database server 108 to extract one or more images from the database server 108. Further, the communication manager 218 stores the one or more images as the image data 230. In an alternate embodiment, the communication manager 218 stores the images in the database server 108. The communication manager 218 includes various protocol stacks such as, but not limited to, Transmission Control Protocol and Internet Protocol (TCP/IP), User Datagram Protocol (UDP), and 2G, 3G, or 4G communication protocols. The communication manager 218 transmits and receives the messages/data through the transceiver 204 in accordance with such protocol stacks.

The analysis module 220 extracts an image from the image data 230. Further, the analysis module 220 determines a luminance value associated with each pixel in the image. Based on the luminance value, the analysis module 220 identifies one or more regions in the image. In an embodiment, the one or more regions may include, but not limited to, a shadow region, a mid-tone region, a first highlight region, or a second highlight region. For each pixel in each of the one or more regions, the analysis module 220 determines a chroma value. Based on the chroma value, the analysis module 220 categorizes each pixel, in the one or more regions, in one or more predefined color categories specific to each of the one or more regions. In an embodiment, the one or more predefined color categories may include, but not limited to, a true color category, a fuzzy color category, and a fuzzy neutral category. The counters 226, in the analysis module 220, count the number of pixels in each of the one or more predefined color categories specific to each region. In an embodiment, the counters 226 include an individual counter for each predefined category. Further, the counters 226 store the count of the pixels, in each of the predefined color categories, as the counter data 232. In an embodiment, the counters 226 can be realized through a software counter or a hardware counter. The analysis module 220 utilizes one or more image processing techniques such as color space conversion, scaling, Interpolation, filter techniques (e.g. wiener filter, adaptive filter, etc.) to process the image. In an embodiment, the intermediate images generated during image processing are stored in 230. In an embodiment, the analysis module 220 processes the image prior to at least one of printing, copying, or storing of the image scanned by the scanner 206. In one embodiment, the analysis module 220 processes the images received for printing operation from the computing device 102. The analysis module 220 further includes the characterization module 228. The characterization module 228 determines color characteristics of the image based on the count of the pixels in each of the one or more predefined color categories corresponding to each of the one or more regions. In an embodiment, the characterization module 228 computes a weighted sum of the count of the pixels. The computation of the weighted sum and the determination of the color characteristics of the image are described later in conjunction with FIG. 3.

In an embodiment, the billing module 224 generates a billing structure based on the color characteristics of the image. In an embodiment, the billing structure includes a 3-tier billing model. In an embodiment, tier-1 billing model is used to bill black and white images. Tier-2 and tier-3 billing models are used to bill images that includes color regions. Further, the billing module 224 computes a bill of a printed or copied image based on the billing structure. The billing module 224 stores the billing structure as the billing data 236. In an embodiment, the billing module 224 can be realized through various technologies such as fuzzy logic, and neural networks.

The printer module 222 facilitates the printer 208 to print the image. In an embodiment, the printer module 222 corresponds to a print driver that enables the printer 208 to print the image. In another embodiment, the printer module 222 facilitates the printer 208 to copy the image, after it is scanned using the scanner 206.

Figure 3:
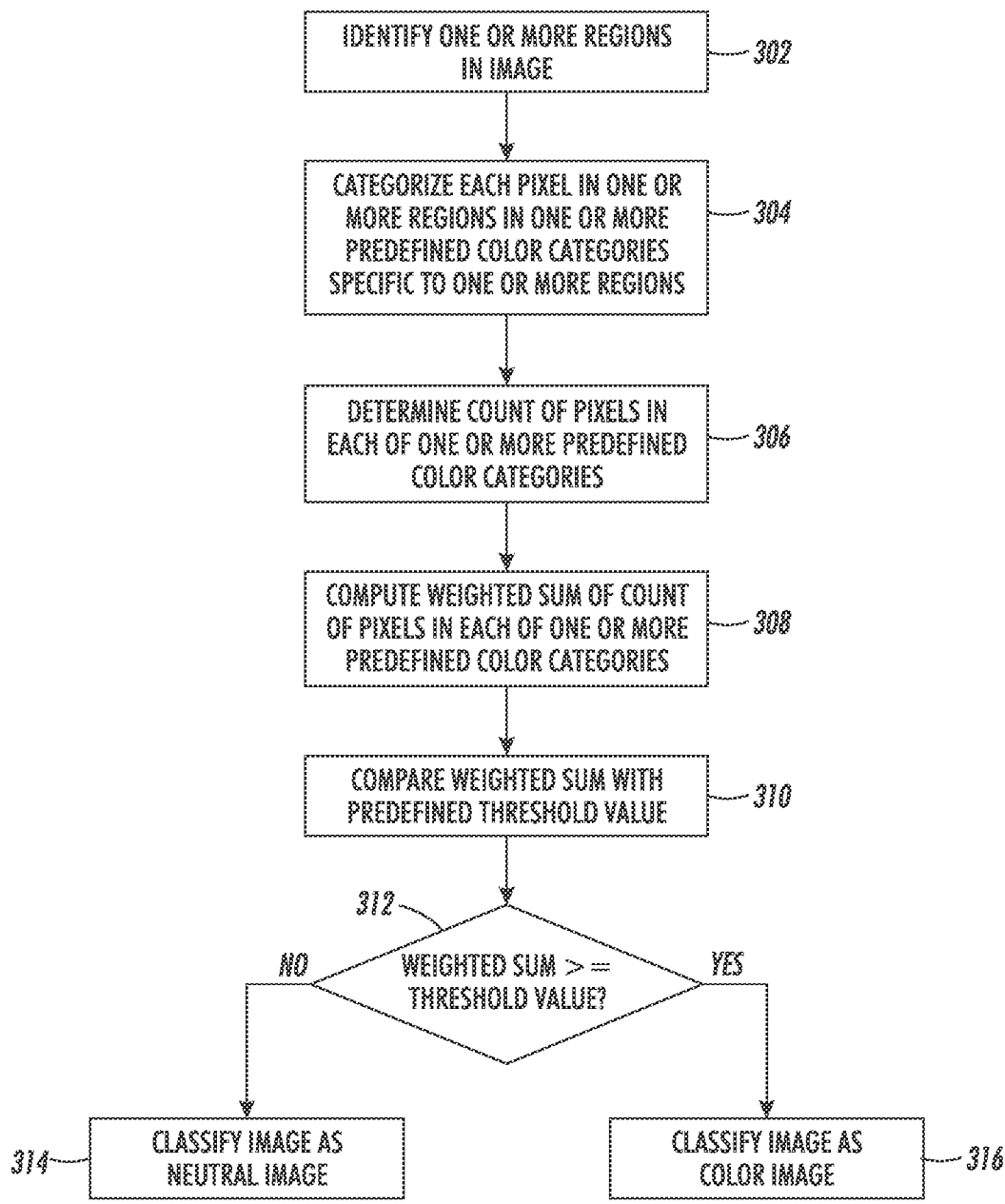
FIG. 3 is a flowchart illustrating a method for determining the color characteristics of an image in accordance with at least one embodiment.

FIG. 3 is a flowchart illustrating a method for determining the color characteristics of an image in accordance with at least one embodiment. The flowchart 300 is described in conjunction with FIG. 1 and FIG. 2.

At step 302, one or more regions in an image are identified. In an embodiment, the analysis module 220 identifies the one or more regions in the image. Prior to the identification of the one or more regions, the scanner module 216 facilitates scanning of a document through the scanner 206 to generate the image. In an alternate embodiment, the communication manager 218 receives the image from the database server 108. Thereafter, the analysis module 220 scales the image using a predetermined pixel window. In an embodiment, the analysis module 220 uses a 4×8 pixel window to scale the image. The analysis module 220 analyzes each pixel in the image to determine the luminance value associated with each pixel. In an embodiment, to determine the luminance value, the analysis module 220 measures R, G, and B values associated with the pixel scanned in RGB color space. The analysis module 220 then determines the luminance channel indicative of luminance value associated with a pixel by computing the weighted sum of the R, G, and B values as illustrated in the following equation:

$$Y = W_r R + W_g G + W_b B \qquad (1)$$

where,
Y=Measure of luminance value;
R=Measure of red component in the pixel;
G=Measure of green component in the pixel;
B=Measure of blue component in the pixel;
$W_r$=Weight associated with the Red component;
$W_g$=Weight associated with the Green component; and
$W_b$=Weight associated with the Blue component.

In an embodiment, the weights $W_r$, $W_g$, and $W_b$ are determined automatically based on the application area. In an alternate embodiment, a user of the system 200 provides the weights $W_r$, $W_g$, and $W_b$. In an embodiment, the luminance value (Y) varies between 0 and 255. Based on the luminance value, the analysis module 220 identifies the one or more regions in the image. For example, in an image, if a group of pixels located in each other's vicinity has a luminance value varying between 0-35, the group of pixels would correspond to one pre-defined region in the image. In an alternate embodiment, the luminance values of a group of pixels are averaged to determine an average luminance value for the group of pixels that is utilized for region determination.

The following table illustrates the one or more example regions and the corresponding luminance values:

TABLE 1

| Classification of the one or more regions according to the luminance value | |
|---|---|
| Luminance Range | Regions |
| 0-31, 32-63 | Shadow Region |
| 64-95, 96-127, 128-159, 160-175 | Midtone Region |
| 176-191, 192-207 | Highlight Region 1 |
| 208-223, 224-231, 232-239, 240-255 | Highlight region 2 |

A person having ordinary skill in the art would understand that the one or more regions and the corresponding luminance values have been mentioned in the table 1 for illustrative purposes. The scope of the disclosure should not be limited to the one or more regions mentioned in the table. In an embodiment, various other regions can be defined according to the luminance value without deviating from the scope of the ongoing description. Further, the person having ordinary skill would understand the scope of the disclosure is not limited to computing the luminance value according to equation 1.

At step 304, each pixel in the one or more regions is categorized in one or more predefined color categories, corresponding to the one or more regions, based on a chroma value associated with each pixel. In an embodiment, the analysis module 220 categorizes each pixel. Prior to the categorization of the pixel, the analysis module 220 determines the chroma value associated with each pixel. For example, the chroma values is computed from the RGB color space by using following equations:

$$V = (0.439*R) - (0.368*G) - (0.071*B) + 128 \quad (2)$$

$$U = -(0.148*R) - (0.291*G) + (0.439*B) + 128 \quad (3)$$

where,

V, U: Two chrominance channels that are deterministic of the chroma value associated with the pixel.

In another embodiment, the U.S. Publication 2012/0143736 A1, published Jun. 7, 2012, and assigned to the same assignee (Xerox Corporation), and which herein incorporated by reference in its entirety discloses another example method for computing the chroma value associated with each pixel.

A person having ordinary skill in the art would understand that computation of the luminance value and the chroma value using Y, U, V color space has been mentioned for illustrative purposes. In an embodiment, the luminance value and the chroma value can be computed in accordance with various other color spaces, such as, but not limited to, CMYK model, CieLAB color space, YCbCr color space and any other suitable color space that supports luminance-chrominance color schemes. Based on the chroma value, the analysis module 220 categorizes each pixel in the one or more predefined color categories corresponding to the one or more regions. The following table illustrates the one or more predefined color categories corresponding to each of the one or more regions with some exemplary ranges:

TABLE 2

One or more predefined color categories corresponding to the one or more regions

| Regions | One or more predefined color categories | Chroma value Range |
|---|---|---|
| Shadow Region | $TC_{Shadow}$: True color pixel in shadow region | chroma value <= 108, or 148 <= chroma value |
| | $FC_{Shadow}$: Fuzzy color Pixel in shadow region | 108 < chroma value <= 118, or 138 <= chroma < 148 |
| Midtone Region | $TC_{Midtone}$: True color pixel in Midtone region | chroma value <= 113, or chroma value >= 143 |
| | $FC_{Midtone}$: Fuzzy color Pixel in Midtone region | 113 < chroma value <= 125, or 131 <= chroma < 143 |
| Highlight Region 1 | $TC_{Highlight-1}$: True color pixel in Highlight-1 region | chroma value <= 108, or chroma value >= 148 |
| | $FC_{Highlight-1}$: Fuzzy color Pixel in Highlight-1 region | 108 < chroma value <= 118, or 138 <= chroma < 148 |
| | $FN_{Highlight-1}$: Fuzzy neutral Pixel in Highlight-1 region | 118 < chroma value <= 125, or 131 <= chroma < 138 |
| Highlight Region 2 | $TC_{Highlight\ 2}$: True color pixel in Highlight 2 region | chroma value <= 108, or chroma value >= 148 |
| | $FC_{Highlight\ 2}$: Fuzzy color Pixel in Highlight 2 region | 108 < chroma value <= 118, or 138 <= chroma < 148 |
| | $FN_{Highlight-2}$: Fuzzy neutral Pixel in Highlight-1 region | 118 < chroma value <= 126, or 130 <= chroma < 138 |

A person having ordinary skills in the art would understand that the one or more pixels are categorized based on at least one chroma channel, associated with the pixels, that lies in the chroma value ranges specified in Table 2. In an embodiment, the categorization depends on the range of the other chroma channel. In another embodiment, the categorization depends on the combination of both the chroma channels. Further, the person having ordinary skill would understand that one or more predefined color categories corresponding to the one or more regions mentioned in table 2 for illustrative purposes. The one or more regions can be further divided in color categories having finer chroma value ranges.

For example, if a pixel in the "highlight-1" region has a chroma value of 150, the analysis module 220 will categorize the pixel in the "$TC_{Highlight-1}$" region, as the chroma value of the pixel is greater than the predetermined threshold of "148". In another example, if a pixel in the "shadow" region has a chroma value of 130, the analysis module 220 would categorize the pixel in as neutral pixel as the chroma value of the pixel lies outside the predetermined threshold range for $FC_{shadow}$, (i.e., [109,118] or [138,147]).

In another embodiment, the analysis module 220 assigns a tag to each pixel in each of the one or more regions based on the chroma value. In an embodiment, the tag corresponds to the one or more predefined color categories. U.S. Publication 2012/0143736 A1, published Jun. 7, 2012, and assigned to the same assignee (Xerox Corporation), and which is herein incorporated by reference in its entirety, discloses one example method of tagging a pixel.

At step 306, a count of the pixels in each of the one or more predefined color categories is determined. In an embodiment, the counters 226, in the analysis module 220, maintain the count of the pixels in each of the one or more predefined color categories. In an embodiment, the counters 226 may include a counter for each of the one or more predefined color categories specific to each pre-defined region. For example, for the shadow region, the counters 226 include a counter for the "$TC_{shadow}$" category and a counter for the "$FC_{shadow}$" category. Similarly, for the "Highlight-1" region, the counters 226 include a counter for each of the "$TC_{Highlight-1}$" category, "$FC_{Highlight-1}$" category, and "$FN_{Highlight-1}$" category.

Respective category counters in the counters 226 maintain a count of the pixels in each of the one or more predefined color categories. For example, the analysis module 220 categorizes 100 pixels in the "shadow region" in the "$TC_{shadow}$" category. Then, the counter corresponding to the "$TC_{shadow}$" category would maintain a count of 100.

At step 308, a weighted sum of the count of the pixels in each of the one or more predefined color categories is computed for each of the one or more regions. In an embodiment, the analysis module 220 computes the weighted sum of the count of the pixels. In an embodiment, weights are assigned to each of the one or more predefined color categories in each of the one or more regions. In an embodiment, the weights are determined based on the white-point of the scanner 206, the black-point of the scanner 206, and the noise of the scanner 206. In an embodiment, the user of the system 200 inputs the values of the weights. In an embodiment, the analysis module 220 utilizes the following equations to determine the weighted sum for the count of pixels in each of one or more predefined color categories corresponding to the one or more regions:

$$Sum_{Shadow} = w1*TC_{shadow} + w2*FC_{shadow} \quad (4)$$

$$Sum_{Midtone} = w3*TC_{midtone} + w4*FC_{midtone} \quad (5)$$

$$Sum_{Highlight-1} = w5*TC_{Highlight-1} + w6*FC_{Highlight-1} + w7*FN_{Highlight-1} \quad (6)$$

$$Sum_{Highlight-2} = w8*TC_{Highlight-2} + w9*FC_{Highlight-2} + w10*FN_{Highlight-2} \quad (7)$$

A person having ordinary skill would understand that the scope of the invention is not limited to computing weighted sums by using equations 4, 5, 6 and 7. In an embodiment, weighted sum is computed for various combinations of count of pixels in the one or more predefined color categories. For example, following equations may also be used for computing the weighted sum.

$$Sum_1 = w5*TC_{Highlight-1} + w8*TC_{Highlight-2} \quad (8)$$

$$Sum_2 = w3*TC_{midtone} \quad (9)$$

$$Sum_3 = w6*FC_{Highlight-1} + w9*FC_{Highlight-2} + w4*FC_{midtone} \quad (10)$$

At step 310, the weighted sum for each of the one or more regions is compared with a predefined threshold value corresponding to each of the one or more regions. In an embodiment, the analysis module 220 compares the weighted sum with the threshold value.

At step 312, a check is performed whether the weighted sum computed in equations 4-10 exceeds the predetermined threshold value. In an embodiment, the characterization module 228 performs the check. In one embodiment, if at step 312, it is determined that the each of the weighted sum for each of the one or more regions exceeds the corresponding threshold value, step 316 is performed. In an alternate embodiment, if the weighted sum of the predetermined number of regions in the image exceeds the corresponding threshold value, step 316 is performed. In another embodiment, if the pre-determined combination of weighted sums exceeds the corresponding threshold value, step 316 is performed. At step 316, the image is classified as a color image. In an embodiment, the characterization module 228 classifies the image as the color image. In another embodiment, if the number of regions, in the image, that exceeds the threshold value is greater than the number of regions that do not exceeds the threshold value, the image is classified as the color image.

For example, an image includes a "highlight-1" region, a "highlight-2" region and a "midtone" region. Weighted sum of the count of pixels in the "highlight-1" region and the "highlight-2" region exceeds the corresponding threshold value and the weighted sum of the count of pixels in the "midtone" region does not exceed the threshold value. The image may be classified as the color image since at least two of the three regions in the image exceed the threshold value. A person having ordinary skill would understand that any combination of the one or more regions or weighted sums exceeding the respective predetermined threshold value can be utilized for determining the color characteristics of the image. In another embodiment, any combination of the computed weighted sums computed from a combination of the one or more regions can be utilized for determining the color characteristics of the image. (e.g., equation 8, 9, and 10) For example, if the midtone region exceeds the threshold value, while none of the highlight regions exceeds the respective threshold value, the image can still be classified as the color image. In another example, if some weighted combination of Sum1 and Sum2 is greater than pre-determined threshold TH1, the image can still be classified as color image regardless of the value of Sum3. In yet another example, if only Sum3 is greater than pre-determined threshold TH2 where TH2 is not equal to TH1, only then the image shall be classified as color image.

A person having ordinary skill in the art would understand that scope of disclosure is not limited to above mentioned examples. In an embodiment, various rules can be defined on the weighted sums to classify the images.

If at step 312, it is determined that the weighted sum for each of the one or more regions does not exceed the predetermined threshold value, step 314 is performed. At step 314, the image is classified as a neutral image. In an embodiment, the characterization module 228 classifies the image as the neutral image. In an alternate embodiment, if a predetermined number of regions or weighted sums associated with the regions in the image do not exceed the threshold value, the image is classified as a neutral image. A person having ordinary skill would understand that an image may be classified as a neutral image if any combination of the one or more regions or weighted sums does not exceed respective predetermined threshold value. In another embodiment, if the number of regions, in the image, that do not exceeds the threshold value is greater than the number of regions that exceeds the threshold value, the image is classified as the neutral image. For example, if the midtone region does not exceed the threshold value, while the highlight region exceeds the respective threshold value, the image can still be classified as the neutral image. In another example, if some weighted combination of Sum1 and Sum2 is less than pre-determined threshold TH1, the image can still be classified as neutral image regardless of the value of Sum3. In yet another example, if only Sum3 is less than pre-determined threshold TH2 where TH2 is not equal to TH1, only then the image shall be classified as neutral image.

In an embodiment, the classification of the image as the color image or the neutral image in steps 314 and 316 respectively corresponds to determining the color characteristics of the image.

Figure 4:
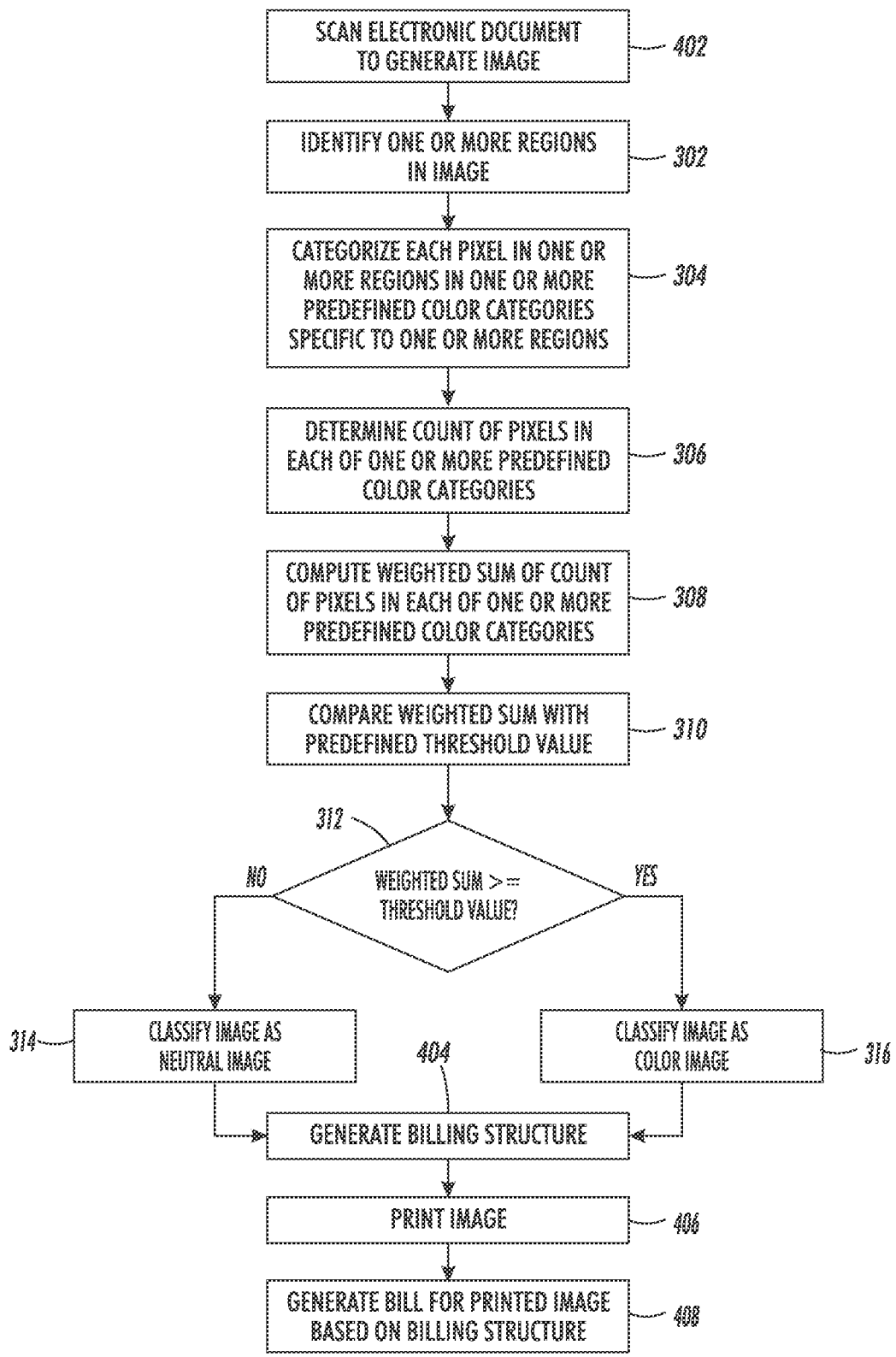
FIG. 4 is a flowchart illustrating a method implementable on a Multi Functional Device (MFD) for determining the color characteristics of an image in accordance with at least one embodiment.

FIG. 4 is a flowchart illustrating a method implementable on a Multi Functional Device (MFD) for determining the color characteristics of an image in accordance with at least one embodiment. The flowchart 400 is described in conjunction with FIG. 3, FIG. 2, and FIG. 1.

At step 402, a document is scanned to generate an image. In an embodiment, the scanner module 216 facilitates the scanner 206 to scan the electronic document. The scanning module 216 stores the scanned image as the image data 230.

Steps 302-316 are performed as described in the flowchart 300.

At step 404, a billing structure is generated according to the color characteristics of the image. In an embodiment, the billing module 224 generates the billing structure. The U.S. Patent Application Publication 2012/0143736 A1 (U.S. application Ser. No. 12/962,298), filed Dec. 7, 2010, published Jun. 7, 2012, and assigned to the same assignee (Xerox Corporation), and which is herein incorporated by reference in its entirety, discloses one example method of generating a billing structure.

At step 406, the image is printed. In an embodiment, the printer module 224 facilitates the printer 208 to print the image. In an embodiment, the image is printed based on the classification of the image.

At step 408, a bill is generated for the printed image based on the billing structure. In an embodiment, the billing module 224 generates the bill.

The disclosed embodiments encompass numerous advantages. Identifying one or more regions in the image based on the luminance value and categorizing each pixel in the one or more predefined color categories (e.g., $FC_{shadow}$, $TC_{highlight-1}$, etc) corresponding to each of the one or more regions enables determination of the color characteristics of each of the one or more regions. Further, computing the weighted sum of the count of pixels in each of the one or more regions enables determination of the color characteristics with improved accuracy by providing more flexibility. For example, the color characteristics of the regions with low luminance or very high luminance value can be determined with improved accuracy. Since weights assigned to the predefined color categories are determined based on the scanner noise, the white-point of the scanner, and the black-point of the scanner; the color characteristics of the image determined according to the weighted sum are not compromised by the errors introduced by the scanner.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in all operating systems and platforms including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of system and method for determining color characteristics of an image have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method implementable on a computing device for determining color characteristics of an image, the method comprising:
   identifying one or more regions in the image based on a luminance value associated with pixels in the image, wherein each region comprises a set of pixels having a predefined range of luminance values;
   categorizing a pixel in the set of pixels in one or more predefined color categories based on a chroma value associated with the pixel, wherein the one or more predefined color categories are determined based on luminance values associated with the set of pixels in a region, from the one or more regions, associated with the pixel;
   determining a weighted sum of count of pixels, categorized in each of the one or more predefined color categories, for each of the one or more regions; and
   determining the color characteristics of the image based on a number of regions, from the one or more regions, having the weighted sum exceeding a predetermined threshold.

2. The method of claim 1 further comprising scaling the image using a predefined pixel window.

3. The method of claim 1, wherein the color characteristics comprises at least one of color, and hue.

4. The method of claim 1 further comprises classifying the image in one or more categories based on the color characteristics, wherein the one or more categories comprise at least a color image category and a neutral image category.

5. The method of claim 1, wherein the one or more regions comprise a shadow region, a mid-tone region, a first highlight region, or a second highlight region.

6. The method of claim 1, wherein the computing device corresponds to a Multi-Function Device (MFD), wherein determining the weighted sum further comprises assigning weights to each of the one or more predefined color categories, wherein the weights are computed based on at least one of a white point offset of the MFD, a black point offset of the MFD, or a noise value associated with the MFD.

7. A method implementable on a Multi-Function Device (MFD), the method comprising:
scanning a document to obtain an image;
identifying one or more regions in the image based on a luminance value associated with one or more pixels in the image, wherein each region comprises a set of pixels having a predefined range of luminance values;
categorizing the set of pixels associated with the one or more regions in one or more predefined color categories corresponding to the each of the one or more regions based on a chroma value associated with the each pixel;
determining color characteristics of the image based on at least one of a count of the categorized pixels in each of the one or more predefined color categories, weights assigned to each of the one or more predefined color categories, a white-point offset of the MFD, a black-point offset of the MFD, or a noise value associated with the MFD, wherein the weights are computed based on at least one of the white point offset of the MFD, the black point offset of the MFD or the noise value associated with the MFD; and
classifying the image at least as a color image or a neutral image based on the color characteristics.

8. The method of claim 7 further comprising generating a billing structure based on at least one of the classification or the color characteristics.

9. The method of claim 8 further comprising printing the image, wherein a cost of the printing is determined based on the billing structure.

10. The method of claim 7, wherein the determining further comprises:
computing at least one weighted sum of the count of the categorized pixels in each of the one or more predefined color categories based on the weights assigned to each of the one or more predefined color categories; and
comparing the at least one weighted sum with a corresponding predefined threshold value, wherein the color characteristics of the image is determined based on the comparison.

11. A Multi-Function Device (MFD) for determining color characteristics of an image, the MFD comprising:
an analysis module configured to:
identify one or more regions in the image based on a luminance value associated with one or more pixels in the image, wherein the each of the one or more regions comprises a set of pixels having a predefined range of luminance values;
determine a chroma value associated with each pixel in each of the one or more regions; and
categorize the each pixel in one or more predefined color categories corresponding to each of the one or more regions based on the chroma value; and
determine the color characteristics of the image based on a count of the categorized pixels in each of the one or more predefined color categories, weights assigned to each of the one or more predefined color categories, a white-point offset of the MFD, a black-point offset of the MFD, or a noise value associated with the MFD, wherein the weights are computed based on at least one of the white point offset of the MFD, the black point offset of the MFD or the noise value associated with the MFD.

12. The MFD of claim 11 further comprising a scanning module configured to facilitate scanning of a document to obtain the image.

13. The MFD of claim 11, wherein the analysis module further comprises a counter associated with each of the one or more predefined color categories, wherein the counter maintains the count of the categorized pixels in each of the one or more predefined color categories.

14. The MFD of claim 11, wherein the analysis module further comprises a characterization module, wherein the characterization module determines the color characteristics.

15. The MFD of claim 14, wherein characterization module is further configured to classify the image at least as a color image or a neutral image based on the color characteristics.

16. The MFD of claim 15 further comprising a billing module configured to generate a billing structure based on the color characteristics.

17. The MFD of claim 16, further comprising a printer module configured to facilitate printing of the image, wherein a cost of the print is determined based on the billing structure.

18. The MFD of claim 11, wherein the analysis module is further configured to compute a weighted sum of the count of the categorized pixels in each of the one or more predefined color categories.

19. The MFD of claim 18, wherein the analysis module is further configured to compare at least one of the weighted sums with a predefined threshold value, wherein the color characteristics is determined based on the comparison.

20. The MFD of claim 11, wherein the one or more regions comprise a shadow region, a mid-tone region, a first highlight region, or a second highlight region.

* * * * *